Figure 7:
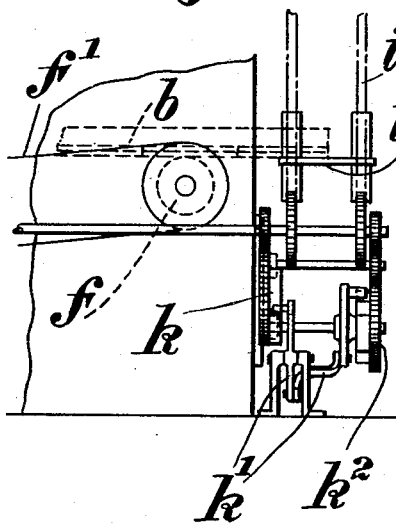

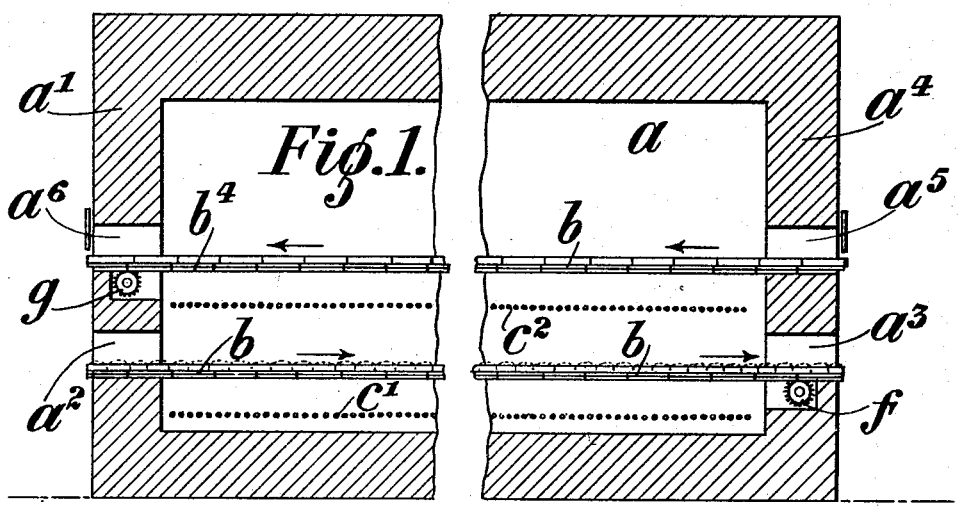
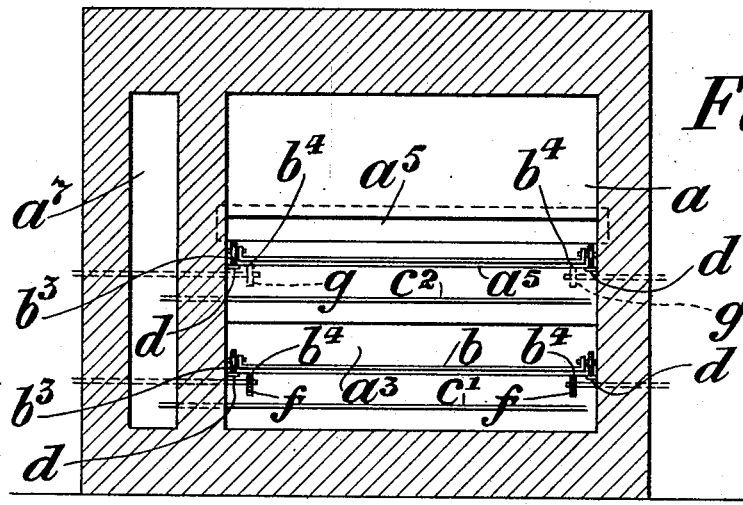
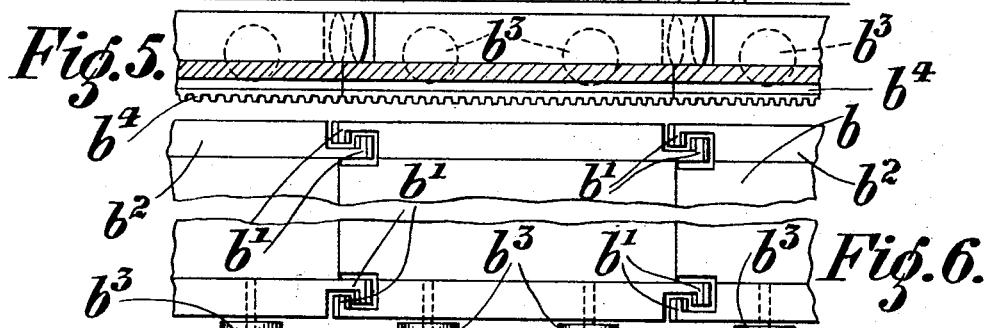

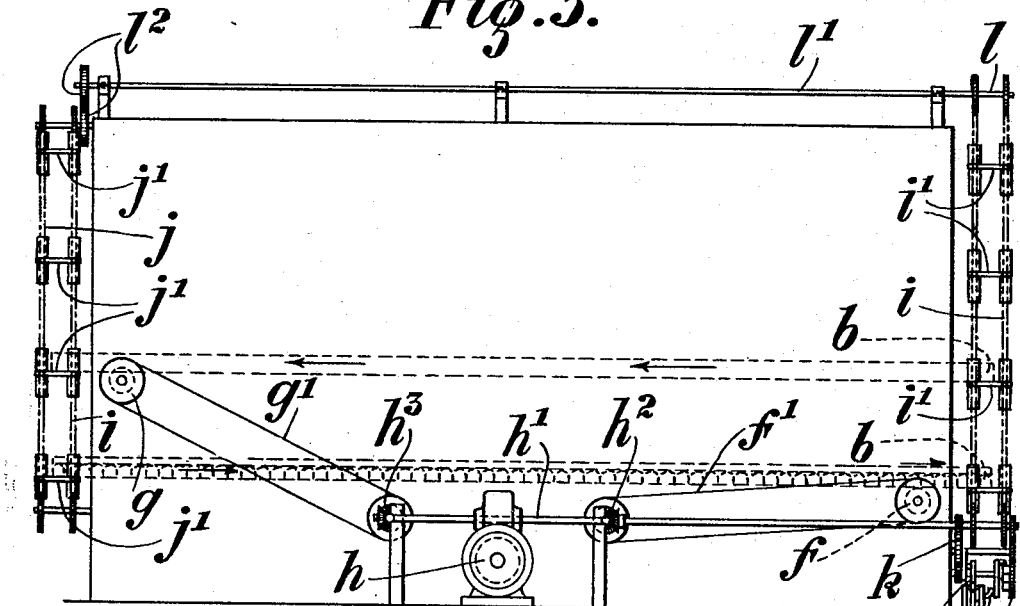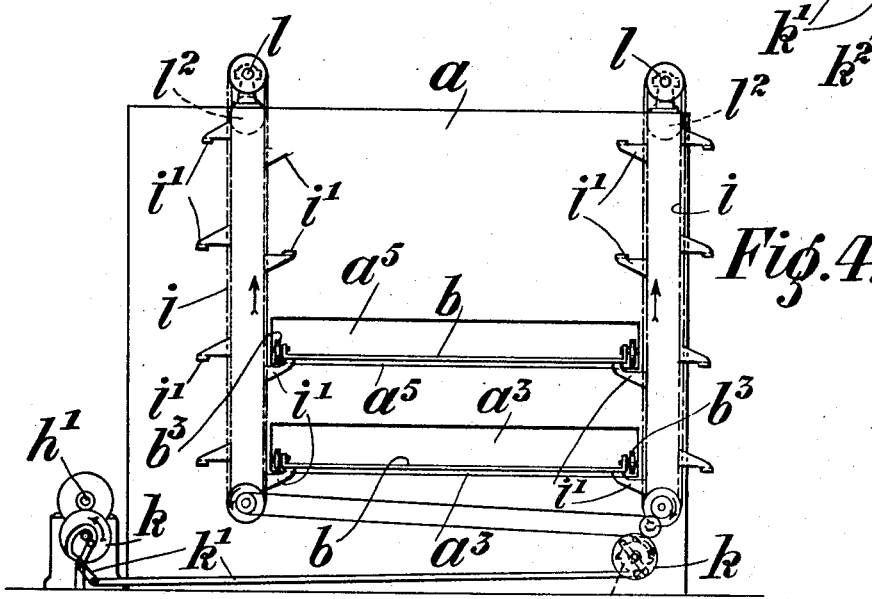

S. McCONNELL.
BAKER'S OVEN OF THE TRAVELING FEED TYPE.
APPLICATION FILED NOV. 12, 1915.

1,199,475.

Patented Sept. 26, 1916.

UNITED STATES PATENT OFFICE.

SAMUEL McCONNELL, OF BELFAST, IRELAND, ASSIGNOR OF ONE-HALF TO JAMES ELLIOTT WILSON, OF BELFAST, IRELAND.

BAKER'S OVEN OF THE TRAVELING-FEED TYPE.

1,199,475.  Specification of Letters Patent.  Patented Sept. 26, 1916.

Application filed November 12, 1915. Serial No. 61,148.

*To all whom it may concern:*

Be it known that I, SAMUEL McCONNELL, a subject of the King of Great Britain and Ireland, residing at Belfast, Ireland, have invented certain new and useful Improvements in Bakers' Ovens of the Traveling-Feed Type, of which the following is a specification.

This invention relates to bakers' ovens of the traveling feed type and has for its object to provide improvements therein which make for economy and efficiency. At present, with ovens of this type, it is usual to employ three rows of heating pipes, the plates with the bread thereon passing, at the baking level, between the intermediate and upper rows and the empty plates are returned, upside down, at a lower level and between the intermediate and lower rows. Under this invention the bread carrying means such as plates or equivalent, after passing with the bread thereon through the oven at the baking level and between an under and upper or overhead heating means as usual, pass upward and are returned empty to the filling end of the oven, above said overhead heating means, so that they are effectively heated thereby and are immediately ready to receive the next batch or supply of bread on reaching the filling end of the oven. It will thus be seen, with this arrangement, that the return level is above the baking level and the arrangement is such that the usual third row of heating pipes can be dispensed with.

My invention may be carried out in the following manner:—I employ two rows of heating pipes or equivalent and the bread carrying means is preferably caused to travel from the filling end of the oven to the discharge end and from the discharge to the filling end and this may be effected by employing a number of suitable interlocking plates or carriers readily detachable the one from the other and adapted to be moved from one end of the oven to the other end thereof by suitable means, for example by means of lower conveying means and upper conveying means in each case suitably driven and by means of which the plates or carriers are adapted to be moved. After traveling from the filling end of the oven on the lower conveying means and reaching the discharge end of the oven and being relieved of the baked bread, each carrier (or carriers if it is arranged to transfer more than one at a time) is transferred from the level of the lower conveying means to the level of the higher conveying means by suitable means which is preferably adapted to automatically disconnect the carrier or carriers to be transferred say to the upper level from the carrier to carriers on the lower level and to connect it (or them) with the carrier or carriers on the upper level or vice versa. The transfer mechanism is so designed and timed in its action that it will transfer the carriers from the upper or return level in such manner as to maintain the continuity of the same at the lower baking level.

In order that my invention may be clearly understood I have hereunto appended explanatory drawings whereon I have shown, simply by way of illustration or example, one form of baker's oven made in accordance with my invention and have also shown a method of lowering and raising the plates to and from the baking level.

Figure 8:
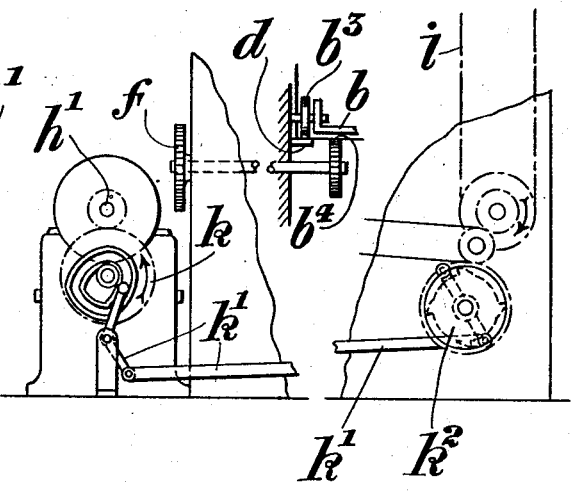

Figure 1 is a longitudinal sectional elevation of the oven. Fig. 2 is a cross sectional elevation of the same. Fig. 3 is an outside elevation of the oven and showing a method of driving the carrier lowering and raising apparatus. Fig. 4 is an outside end elevation at the delivery end of the oven and showing the carrier lifting arrangement thereat. Figs. 5 and 6 are respectively sectional elevation and plan views showing a method of interlocking the carriers whereby each carrier can be very easily connected and disconnected when it is to be moved from the higher to the lower level or vice versa as hereinafter described. Figs. 7 and 8 are detail views of the mechanism for operating the carrier lowering and raising apparatus.

On the drawings the same reference letters wherever repeated indicate the same parts.

Referring to the drawings, the oven $a$ is made so that the unbaked bread, placed on the plates $b$ at the filling end $a^1$, passes from the end $a^1$ through the door $a^2$ and is conveyed through the oven, on plates $b$, to and through the door $a^3$ at the delivery end $a^4$, the plates $b$ with the bread thereon passing between the heating pipes, or equivalent heating means, $c^1$, and $c^2$, and after being relieved of the baked bread, being raised up (one or more at a time) by the elevator $i$, hereinafter described, and again entering the oven $a$ through the door $a^5$, they then go back through the oven above the heating means $c^2$ (being pulled through by the wheels $g$) to the filling end $a^1$ where they are delivered on to the plate supports $j^1$ waiting for them on the conveyer $j$ which, when it has received them, is moved so as to take them down to the filling level where they are filled and again passed into the oven $a$ at the baking level and through the procedure before described. In the example shown the plates $b$ are provided with interlocking parts $b^1$ at their sides $b^2$ and they are also provided with rollers $b^3$, or equivalent, adapted to run on rails $d$ at the sides of the oven $a$ (see Fig. 2), the train of interlocking plates being pulled through the oven $a$ by providing racks $b^4$ on their undersides which racks are engaged by toothed wheels $f$ at the delivery end $a^4$ of the oven $a$ and by toothed wheels $g$ at the feeding or filling end $a^1$ of the oven $a$. These wheels $f$ and $g$ may, as shown, be driven from a motor $h$ by the shaft $h^1$ and bevel gears $h^2$ and $h^3$ which, respectively, drive the chains or belts $f^1$ and $g^1$ and toothed wheels $f$ and $g$. When the plates $b$ emerge from the delivery door $a^3$ the baked bread is removed from them and the empty plates are raised by the elevator $i$ which is driven intermittently from the motor shaft $h^1$ by the cam $k$ and lever and link gear $k^1$ in conjunction with the pawl and ratchet gear $k^2$ (as shown more particularly at Figs. 7 and 8) so that the plate supports $i^1$ of the elevator $i$ remain at rest to receive a plate $b$ (or more than one if desired) as it emerges from the oven door $a^3$ at the baking level, a plate $b$, which has been emptied and raised to the higher or return level, at the previous movement of the elevator, being at this time moved from the support $i$ at the said higher or return level which support is also at rest, thereby allowing the plate $b$ to be moved, as will be apparent hereinafter, into the oven through the door $a^5$, whence it passes through the oven to the filling end where it passes out through the door $a^6$. Before the plate $b$, which has just left the support $i^1$ at the higher or return level, is completely in the oven, the next succeeding plate $b$ which is on the support $i$ at the lower level is moved up by the movement of the intermittent motion of the elevator gear $k^1$ and $k^2$ which causes the elevator to move quickly up and lift the plate $b$ the distance between the baking and the return level, causing the parts $b^1$ of the two plates to be interlocked at the higher level. It will be understood that as each plate $b$ is interlocked with the one previously raised it forms part of the chain of plates moved into and through the oven under the action of the wheel $g$. Movement of the elevator is, of course, timed to take place as each plate is being moved into the oven in this manner and when its part $b^1$ is correctly positioned above the corresponding interlocking portion of the next plate to be raised. Similarly, the conveyer $j$ at the filling end which is similar in construction to the elevator $i$ but is driven in the reverse direction to said elevator through the medium of the shafts $l^1$, formed by the extensions of the elevator spindles $l$, and the spur wheels $l^2$, is adapted to take a plate from the higher or return level and pass it down and interlock it with the plates at the lower or baking level thereby insuring the continuity of the plates at both levels. The plates $b$ returning from the delivery end to the filling end are heated by the heating means $c^2$ and, when they reach the filling end $a^1$, they are immediately ready to receive the next batch of unbaked bread.

The heating tubes $c^1$ and $c^2$, or other heating means, may be heated, as usual, by fires in the fire space $a^7$, and, with ovens constructed in accordance with my invention it may be found advantageous to adopt an automatic feed of the coal or other fuel to the fire or fires.

Having now fully described my invention what I claim and desire to secure by Letters Patent is:—

1. A baker's oven of the traveling feed type, having an oven chamber, under and upper heating means in said chamber, bread carriers, means for conveying said bread carriers through the oven chamber from the front thereof and between the under and upper heating means, means for elevating the bread carriers at the back of the oven, and means for returning said bread carriers from the back of the oven through said chamber to the front thereof and above said upper heating means.

2. A baker's oven of the traveling feed type, having an oven chamber, under and upper heating means in said chamber, bread carriers, means for conveying said bread carriers, with the bread thereon, through the oven chamber at the baking level from the one end thereof and between the under and upper heating means, means for elevating the bread carriers at the other end of the oven, means for returning said bread carriers through the oven chamber and from the other end thereof and above said upper heating means, and means for again lowering the bread carriers to the baking level.

3. A baker's oven of the traveling feed type, having an oven chamber, under and upper heating tubes in said chamber, bread carriers, means for conveying said bread carriers, with the bread thereon, through the oven chamber from the front thereof and between the under and upper heating tubes, means for elevating said bread carriers at the back of the oven, and means for returning said bread carriers from the back of the oven through said chamber to the front thereof and above said upper heating tubes.

4. A baker's oven of the traveling feed type, having an oven chamber, under and upper heating tubes in said chamber, bread carriers, means for conveying said bread carriers, with the bread thereon, through the oven chamber from the front thereof and between the under and upper heating tubes, means for elevating said bread carriers at the back of the oven, means for returning said bread carriers from the back of the oven through said chamber to the front thereof and above said upper heating tubes, and means for again lowering the bread carriers to the baking level.

5. A baker's oven of the traveling feed type, having an oven chamber, under and upper heating means in said chamber, detachable bread carriers, means for conveying said detachable bread carriers, with the bread thereon, through the oven chamber from the front thereof and between the under and upper heating means, means for elevating the detachable bread carriers at the back of the oven, means for returning said detachable bread carriers from the back of the oven through said oven to the front thereof and above said upper heating means, and means for again lowering the detachable bread carriers to the baking level.

6. A baker's oven of the traveling feed type, having an oven chamber, under and upper heating means in said chamber, detachable bread carriers having rollers, means for conveying said detachable bread carriers, with the bread thereon, through the oven chamber from the front thereof and between the under and upper heating means, means for elevating said detachable bread carriers at the back of the oven, and means for returning said detachable bread carriers from the back of the oven through said chamber to the front thereof and above said upper heating means.

7. A baker's oven of the traveling feed type, having an oven chamber, under and upper heating means in said chamber, detachable bread carriers having rollers, means for conveying said detachable bread carriers, with the bread thereon, through the oven chamber from the front thereof and between the under and upper heating means, means for elevating said detachable bread carriers at the back of the oven, means for returning said detachable bread carriers from the back of the oven through said chamber to the front thereof and above said upper heating means and means for again lowering the bread carriers to the baking level.

8. A baker's oven of the traveling feed type, having under and upper heating means, detachable bread carriers comprising a plurality of interlocking plates having racks on their undersides, toothed wheels at each end of the oven gearing with said racks for conveying said bread carriers, with the bread thereon, through the oven from the front thereof and between the under and upper heating means, means for elevating said bread carriers at the back of the oven, and means for returning said bread carriers from the back of the oven to the front thereof and above said upper heating means.

9. A baker's oven of the traveling feed type, having under and upper heating means, detachable bread carriers comprising a plurality of interlocking plates having racks on their undersides, toothed wheels at each end of the oven gearing with said racks for conveying said bread carriers, with the bread thereon, through the oven from the front thereof and between the under and upper heating means, means for elevating said bread carriers at the back of the oven, means for returning said bread carriers from the back of the oven to the front thereof and above said upper heating means, and means for again lowering the bread carriers to the baking level.

10. A baker's oven of the traveling feed type, having under and upper heating means, detachable bread carriers comprising a plurality of interlocking plates, rollers fitted in connection with the plates, racks on the undersides of the plates, toothed wheels at each end of the oven gearing with said racks for conveying said bread carriers, with the bread thereon, through the oven from the front thereof and between the under and upper heating means, means for elevating said bread carriers at the back of the oven, and means for returning said bread carriers from the back of the oven to the front thereof and above said upper heating means.

11. A baker's oven of the traveling feed type, having an oven chamber, under and upper heating means in said chamber, detachable bread carriers, means for conveying said bread carriers, with the bread thereon, through the oven chamber from the front thereof and between the under and upper heating means, conveyer means for elevating said bread carriers at the back of the oven, means for returning said bread carriers from the back of the oven through said chamber to the front thereof and above said upper heating means, and conveyer means for again lowering said bread carriers at the front of the oven to the baking level.

12. A baker's oven of the traveling feed type, having an oven chamber, under and upper heating means in said chamber, bread carriers, means for conveying said bread carriers, with the bread thereon, through the oven chamber from the front thereof and between the under and upper heating means, mechanical means for intermittently elevating said bread carriers at the back of the oven, mechanical means for returning said bread carriers from the back of the oven through said chamber to the front thereof and above said upper heating means and mechanical means for intermittently lowering said bread carriers at the front of the oven to the baking level.

13. A baker's oven of the traveling feed type, having an oven chamber, under and upper heating means in said chamber, bread carriers, rack and pinion mechanism for conveying said bread carriers through the oven chamber from the front thereof and between the under and upper heating means, cam mechanism and pawl and ratchet mechanism for intermittently elevating and intermittently lowering said bread carriers at the back and front of the oven respectively, and rack and pinion mechanism for returning said bread carriers from the back of the oven to the front thereof.

14. A baker's oven of the traveling feed type, having under and upper heating means, bread carriers, teeth on the bread carriers, toothed wheels gearing with said teeth for conveying said bread carriers through the oven from the front thereof and between the under and upper heating means, cam mechanism and pawl and ratchet mechanism for intermittently elevating and intermittently lowering said bread carriers at the back and front of the oven respectively, and toothed wheels gearing with the teeth of the bread carriers for returning said bread carriers from the back of the oven to the front thereof.

15. A baker's oven of the traveling feed type, having an oven chamber, under and upper heating means in said chamber, detachable bread carriers, means for conveying said bread carriers, with the bread thereon, through the oven chamber from the front thereof and between the under and upper heating means, conveyer means comprising an endless band, and bread carrier supports on the band for elevating said bread carriers at the back of the oven, means for returning said bread carriers from the back of the oven through said chamber to the front thereof and above said upper heating means, and conveyer means comprising an endless band, and bread carrier supports on the band for again lowering said bread carriers at the front of the oven to the baking level.

In testimony whereof I affix my signature in presence of two witnesses.

SAMUEL McCONNELL.

Witnesses:
 ANDREW HAMILTON,
 JOHN KNOX.

Copies of this patent may be obtained for five cents each, by addressing the "Commissioner of Patents, Washington, D. C."